US008571768B2

(12) United States Patent
Takahashi et al.

(10) Patent No.: US 8,571,768 B2
(45) Date of Patent: Oct. 29, 2013

(54) CONTROL OF AND CONTROL METHOD FOR VEHICLE CONTINUOUSLY VARIABLE TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 311 days.

(21) Appl. No.: 12/836,099

(22) Filed: Jul. 14, 2010

(65) Prior Publication Data

US 2011/0015835 A1   Jan. 20, 2011

(30) Foreign Application Priority Data

Jul. 17, 2009   (JP) .................................. 2009-169161

(51) Int. Cl.
*G06F 17/00* (2006.01)
*F16H 31/00* (2006.01)
*B60W 10/04* (2006.01)

(52) U.S. Cl.
USPC .............................. 701/51; 475/118; 477/115

(58) Field of Classification Search
USPC ........... 701/54, 55, 56, 61, 66, 67, 85, 86, 93, 701/95, 101, 102, 103, 104, 105, 29.1, 701/29.5; 474/111, 169, 473.1, 567, 117, 474/821; 477/42, 43, 46, 141, 15, 111, 50, 477/69, 76, 98, 117, 37, 97, 91; 123/288, 123/258, 292, 321, 90.23, 90.4, 146, 336, 123/348, 47 AB, 65 V, 41.05, 339.22, 123/339.24, 381, 406.55, 406.7, 435, 678, 123/686, 689, 558, 421, 425; 73/593, 660, 73/820, 114.63, 114.41–114.57, 204.19; 74/473.1, 567, 117, 821; 180/170, 336; 280/12.12, 12.14, 237
See application file for complete search history.

(56) References Cited

U.S. PATENT DOCUMENTS

| 4,672,863 A | 6/1987 | Itoh et al. |
| 4,674,359 A | 6/1987 | Hattori |

(Continued)

FOREIGN PATENT DOCUMENTS

| DE | 34 24 646 A1 | 2/1985 |
| DE | 100 51 692 A1 | 5/2001 |

(Continued)

OTHER PUBLICATIONS

U.S. Appl. No. 12/836,021, filed Jul. 14, 2010, Nonomura et al.

(Continued)

*Primary Examiner* — Muhammad Shafi
(74) *Attorney, Agent, or Firm* — Foley & Lardner LLP

(57) ABSTRACT

A control device for a vehicle continuously variable transmission 4 includes: final speed ratio setting means for setting an overall speed ratio of the continuously variable transmission mechanism 20 and the subtransmission mechanism 30 to be reached on the basis of an operating condition of the vehicle as a final speed ratio; shift control means for controlling the continuously variable transmission mechanism 20 and the subtransmission mechanism 30 such that the overall speed ratio aligns with the final speed ratio at a predetermined transient response; stagnation determining means for determining whether or not a stagnation period in which the overall speed ratio stops varying will occur during an upshift; and reduction control means for shortening a time required to advance to an inertia phase from a start of a shift in the subtransmission mechanism 30 following a determination that the stagnation period will occur.

11 Claims, 14 Drawing Sheets

(56) References Cited

U.S. PATENT DOCUMENTS

| | | | |
|---|---|---|---|
| 4,793,217 A | 12/1988 | Morisawa et al. | |
| 5,207,122 A | 5/1993 | Minagawa | |
| 5,282,401 A | 2/1994 | Hebbale et al. | |
| 5,427,579 A | 6/1995 | Kanehara et al. | |
| 5,456,647 A | 10/1995 | Holbrook | |
| 5,468,198 A | 11/1995 | Holbrook et al. | |
| 5,707,313 A | 1/1998 | Suzuki | |
| 5,711,741 A | 1/1998 | Inoue | |
| 5,827,153 A | 10/1998 | Yasue et al. | |
| 5,947,856 A | 9/1999 | Tabata et al. | |
| 5,984,829 A | 11/1999 | Minagawa et al. | |
| 6,157,884 A | 12/2000 | Narita et al. | |
| 6,295,497 B1 | 9/2001 | Kuras | |
| 6,344,008 B1 * | 2/2002 | Nagano et al. | 475/1 |
| 6,514,165 B2 | 2/2003 | Saito | |
| 6,543,593 B2 | 4/2003 | Saito | |
| 6,876,913 B2 | 4/2005 | Segawa et al. | |
| 7,108,631 B2 | 9/2006 | Inoue et al. | |
| 7,637,836 B2 | 12/2009 | Watanabe et al. | |
| 7,780,570 B2 | 8/2010 | Iwatsuki et al. | |
| 8,052,572 B2 | 11/2011 | Unno | |
| 8,131,436 B2 | 3/2012 | Suzuki et al. | |
| 8,187,145 B2 | 5/2012 | Kaminsky et al. | |
| 8,204,659 B2 | 6/2012 | Kouno et al. | |
| 8,214,093 B2 | 7/2012 | Heap et al. | |
| 8,216,110 B2 | 7/2012 | Katakura et al. | |
| 2002/0034999 A1 | 3/2002 | Saito | |
| 2002/0035011 A1 | 3/2002 | Saito | |
| 2005/0090365 A1 | 4/2005 | Tamai et al. | |
| 2005/0164820 A1 | 7/2005 | Miyata et al. | |
| 2006/0089775 A1 | 4/2006 | Whitton et al. | |
| 2007/0129922 A1 * | 6/2007 | Lee et al. | 703/13 |
| 2008/0020896 A1 | 1/2008 | Kamishima | |
| 2008/0032861 A1 | 2/2008 | Maki et al. | |
| 2008/0096721 A1 | 4/2008 | Honma et al. | |
| 2009/0105041 A1 | 4/2009 | McKenzie et al. | |
| 2009/0111650 A1 | 4/2009 | Jeon | |
| 2010/0057316 A1 * | 3/2010 | Tanaka et al. | 701/61 |
| 2010/0228412 A1 | 9/2010 | Sah | |
| 2011/0231048 A1 | 9/2011 | Matsubara et al. | |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 * | 3/2008 |
| JP | 2008059052 * | 3/2008 |
| WO | WO 2009/075283 A1 | 6/2009 |

OTHER PUBLICATIONS

U.S. Appl. No. 12/836,104, filed Jul. 14, 2010, Takahasi et al.
U.S. Appl. No. 12/836,128, filed Jul. 14, 2010, Takahashi et al.
U.S. Appl. No. 12/837,129, filed Jul. 15, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
R. Nonomura et al., US PTO Notice of Allowance, U.S. Appl. No. 12/828,604, dated Feb. 13, 2012, (17 pgs.).
R. Nonomura et al., US PTO Notice of Allowance, U.S. Appl. No. 12/828,604, dated Jun. 7, 2012, (12 pgs.).
S. Takahashi et al., US PTO Notice of Allowance on U.S. Appl. No. 12/836,172 DTD Oct. 19, 2012, (20 pgs.).
S. Takahashi et al., US PTO Notice of Allowance on U.S. Appl. No. 12/836,104 DTD Feb. 20, 2013, (12 pgs.).
S. Takahashi et al., Non-Final Office Action, U.S. Appl. No. 12/837,133 dated Apr. 3, 2013 with references, (71 pages).
S. Takahashi et al., US PTO Notice of Allowance on U.S. Appl. No. 12/836,021 DTD Oct. 5, 2012, (45 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/836,128 DTD Sep. 17, 2012, (50 pgs.).
S. Takahashi et al., US PTO Notice of Allowance on U.S. Appl. No. 12/837,129 DTD Oct. 11, 2012, (20 pgs.).
S. Takahashi et al., U.S. Notice of Allowance; U.S. Appl. No. 12/837,133, dated Jul. 11, 2013, (9 pages).

* cited by examiner

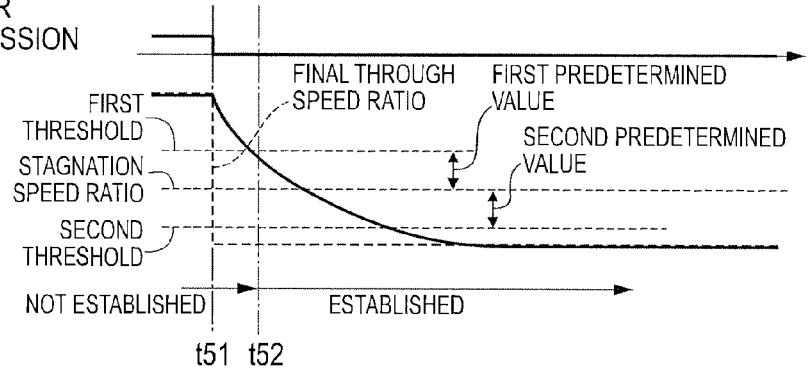
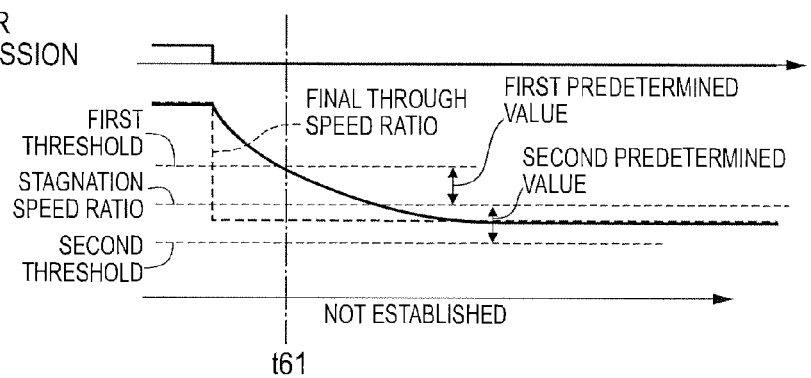

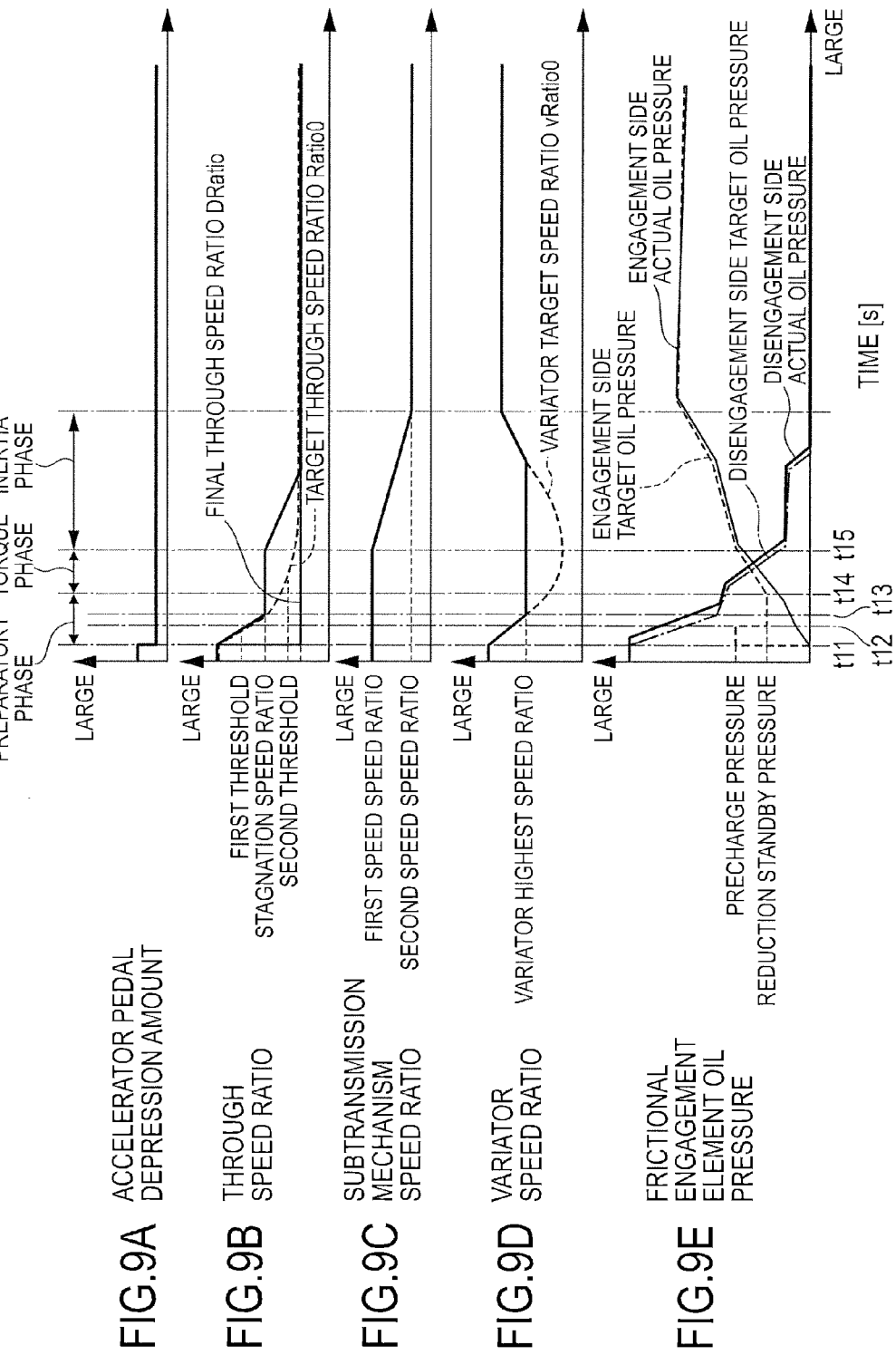

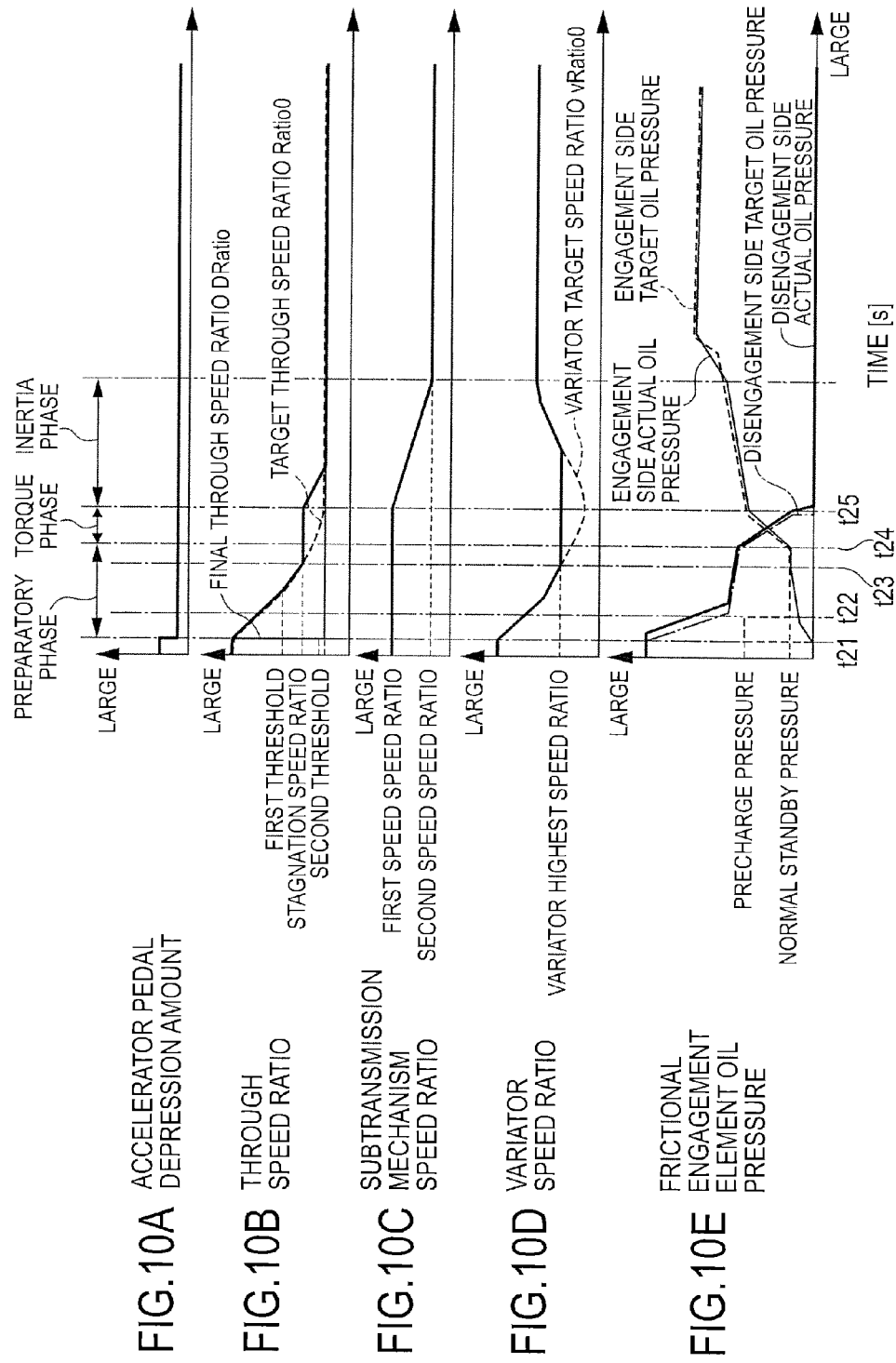

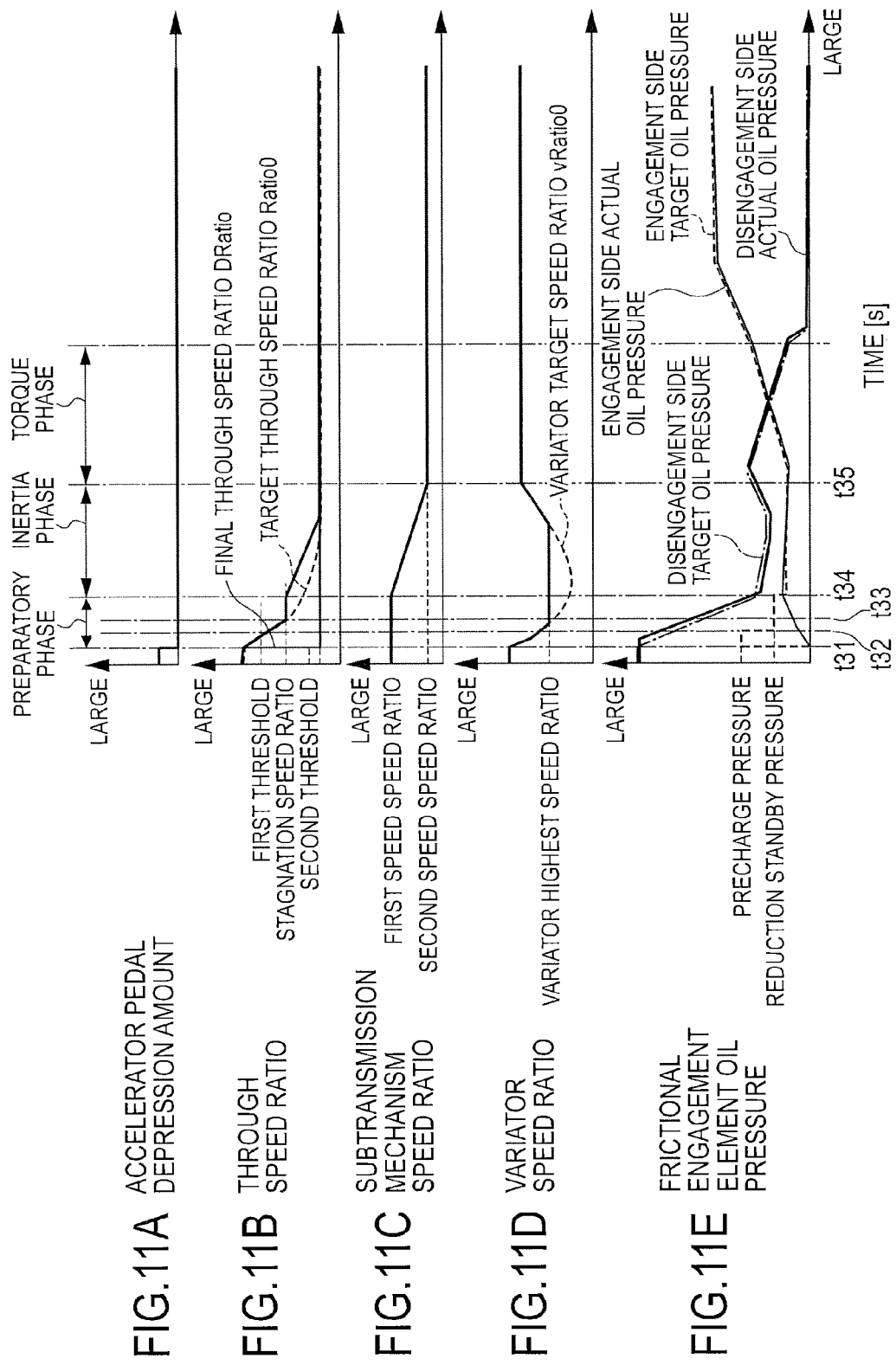

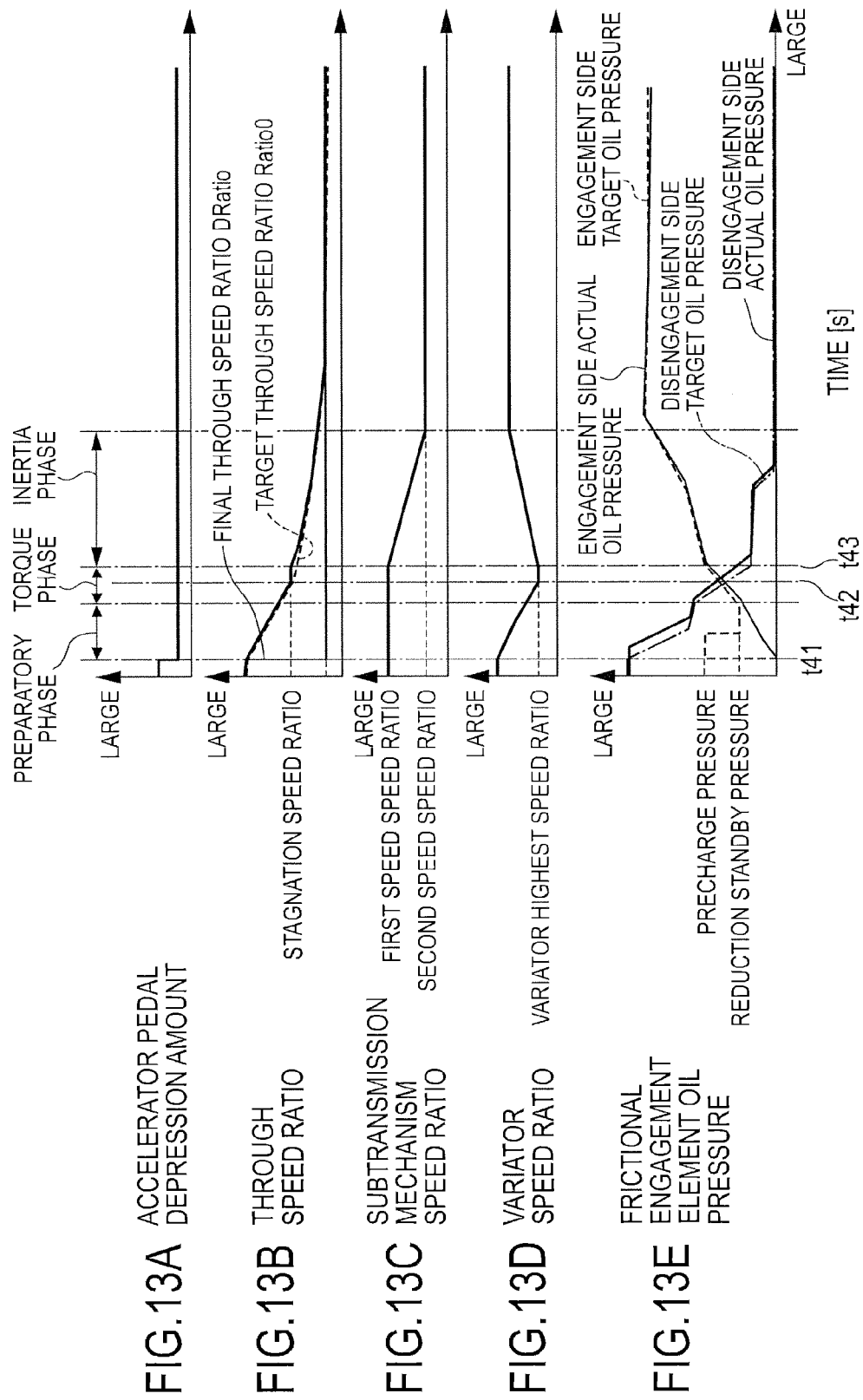

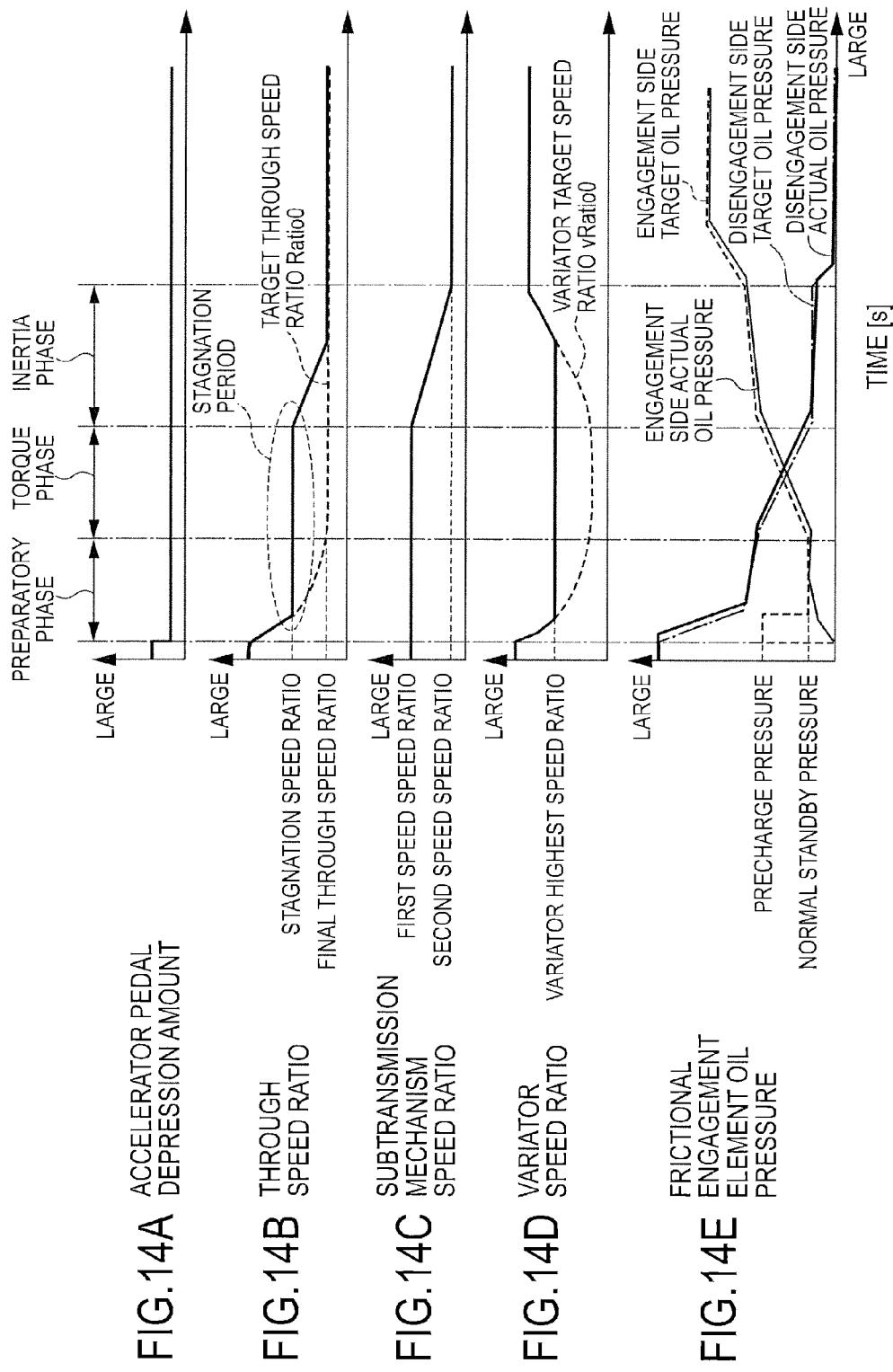

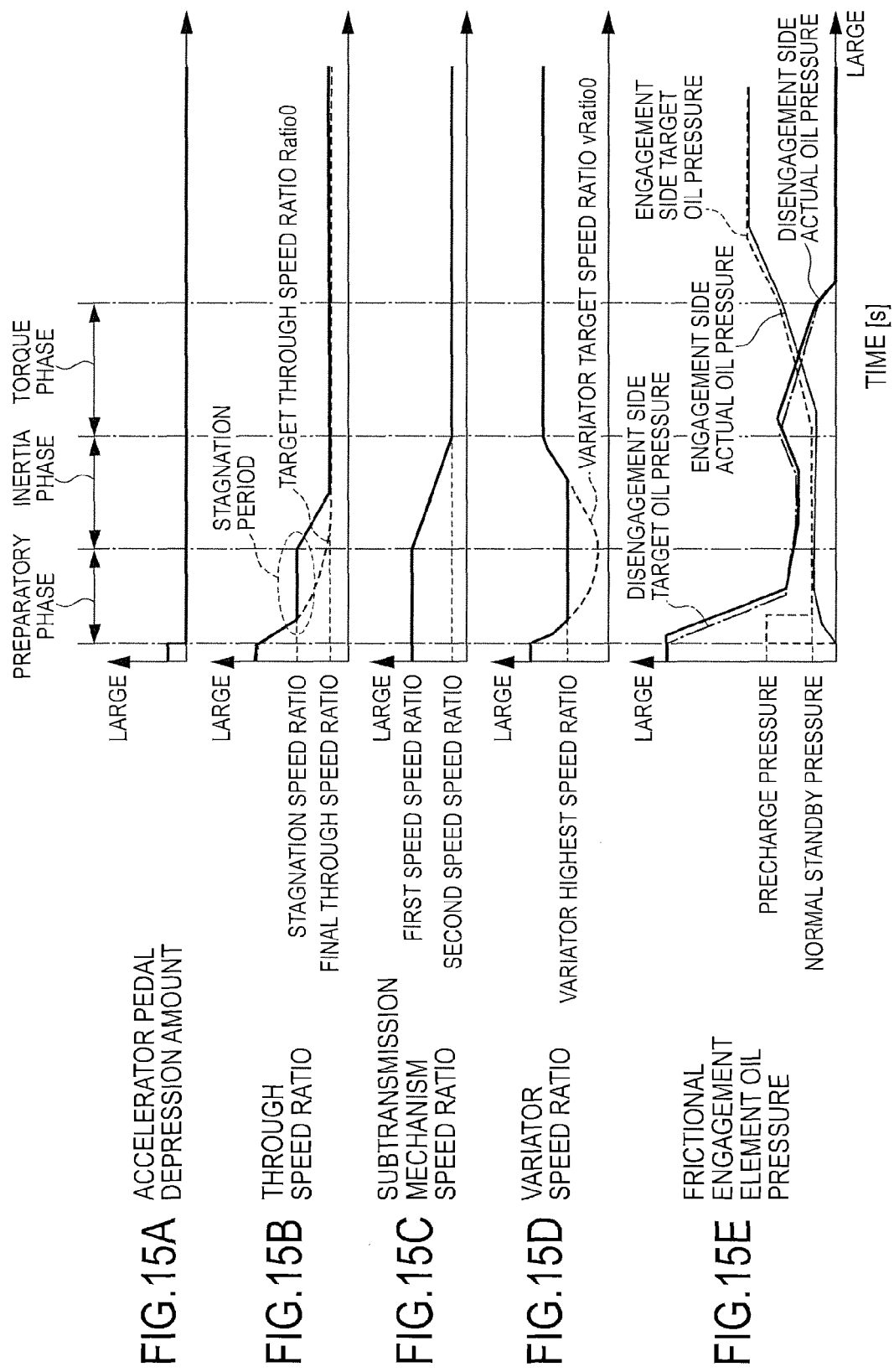

CONTROL OF AND CONTROL METHOD FOR VEHICLE CONTINUOUSLY VARIABLE TRANSMISSION

This application claims priority from Japanese Patent Application 2009-169161, filed Jul. 17, 2009, which is incorporated herein by reference in its entirety.

TECHNICAL FIELD OF THE INVENTION

This invention relates to control of a vehicle continuously variable transmission.

BACKGROUND OF THE INVENTION

JPH5-79554A, published by the Japan Patent Office in 2002, discloses a control device for a vehicle continuously variable transmission that includes, in addition to a continuously variable transmission mechanism, a subtransmission mechanism which can be switched between a plurality of gear positions, in which an overall speed ratio of the continuously variable transmission mechanism and the subtransmission mechanism is controlled to a target final speed ratio by controlling the continuously variable transmission mechanism and the subtransmission mechanism in accordance with an operating condition of the vehicle.

SUMMARY OF THE INVENTION

However, in the control device for the conventional continuously variable transmission for a vehicle described above, if the continuously variable transmission mechanism reaches a Highest speed ratio before the speed ratio of the subtransmission mechanism begins to vary, the overall speed ratio remains unvarying until the speed ratio of the subtransmission mechanism begins to vary. Accordingly, an engine rotation speed does not vary smoothly during a shift, and as a result, a driving performance deteriorates.

It is therefore an object of this invention to suppress driving performance deterioration when a continuously variable transmission mechanism reaches a Highest speed ratio before a speed ratio of a subtransmission mechanism begins to vary.

To achieve this object, this invention is a control device for a vehicle continuously variable transmission comprising a continuously variable transmission mechanism having a speed ratio that can be modified continuously, and a subtransmission mechanism that is provided in series with the continuously variable transmission mechanism, includes a first gear position and a second gear position, the second gear position having a smaller speed ratio than the first gear position, as forward gear positions, and switches between the first gear position and the second gear position by engaging or disengaging a plurality of frictional engagement elements selectively, wherein the control device sets an overall speed ratio of the continuously variable transmission mechanism and the subtransmission mechanism to be reached on the basis of an operating condition of the vehicle as a final speed ratio, and controls the continuously variable transmission mechanism and the subtransmission mechanism such that the overall speed ratio aligns with the final speed ratio at a predetermined transient response. During an upshift, the control device determines whether or not a stagnation period in which the overall speed ratio stops varying will occur, and after determining that the stagnation period will occur, the control device shortens a time required to advance to an inertia phase from a start of a shift in the subtransmission mechanism.

Details of this invention as well as other features and advantages thereof are set forth in the following description of the specification and illustrated in the attached figures.

BRIEF DESCRIPTION OF THE DRAWINGS

FIGS. 7A-7C are time charts illustrating conditional expressions (1) and (2).

FIGS. 8A-8C are time charts illustrating the conditional expressions (1) and (2).

FIGS. 9A-9E are time charts illustrating a shift control operation according to the first embodiment of this invention.

FIGS. 10A-10E are time charts illustrating the shift control operation according to the first embodiment of this invention.

FIGS. 11A-11E are time charts illustrating the shift control operation according to the first embodiment of this invention.

FIGS. 13A-13E are time charts illustrating a shift control operation according to the second embodiment of this invention.

FIGS. 14A-14E are time charts showing a case in which a stagnation period occurs during a foot back upshift, serving as a comparative example to the first embodiment of this invention.

FIGS. 15A-15E are time charts showing a case in which a stagnation period occurs during a foot release upshift, serving as a comparative example to the first embodiment of this invention.

DESCRIPTION OF THE PREFERRED EMBODIMENTS

An embodiment of this invention will be described below with reference to the attached drawings. It should be noted that in the following description, a "speed ratio" of a certain transmission mechanism is a value obtained by dividing an input rotation speed of the transmission mechanism by an output rotation speed of the transmission mechanism. Further, a "Lowest speed ratio" denotes a maximum speed ratio of the transmission mechanism, and a "Highest speed ratio" denotes a minimum speed ratio of the transmission mechanism.

Figure 1:
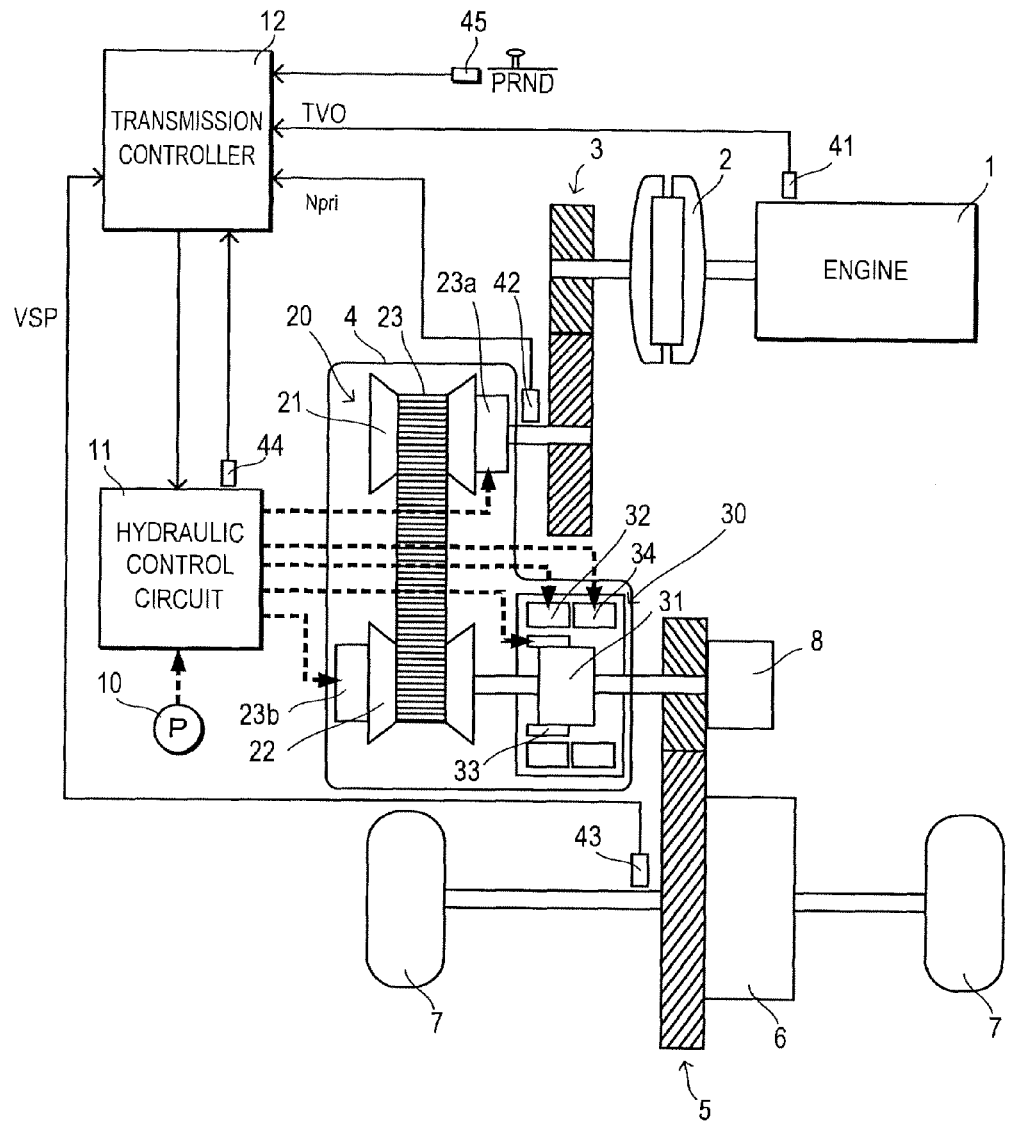
FIG. 1 is a schematic diagram showing the constitution of a vehicle installed with a continuously variable transmission according to a first embodiment of this invention.

FIG. 1 is a schematic constitutional diagram of a vehicle installed with a continuously variable transmission according to an embodiment of this invention. The vehicle has an internal combustion engine 1 as a power source. Output rotation of the engine 1 is transmitted to a drive wheel 7 via a torque converter having a lockup clutch 2, a first gear train 3, a continuously variable transmission (to be referred to as a "transmission 4" hereafter), a second gear train 5, and a final reduction gear 6. The second gear train 5 is provided with a parking mechanism 8 which locks an output shaft of the transmission 4 mechanically so that the output shaft is incapable of rotation during parking.

The vehicle is further provided with an oil pump 10 which is driven using a part of the power of the engine 1, a hydraulic control circuit 11 which regulates an oil pressure from the oil pump 10 and supplies the regulated oil pressure to various sites of the transmission 4, and a transmission controller 12 which controls the hydraulic control circuit 11. The hydraulic control circuit 11 and the transmission controller 12 together constitute shift control means.

To describe the respective constitutions, the transmission 4 includes a belt type continuously variable transmission mechanism (to be referred to as a "variator 20" hereafter), and a subtransmission mechanism 30 provided to the rear of and in series with the variator 20. The term "provided to the rear of" means that the subtransmission mechanism 30 is provided further toward the drive wheel 7 side than the variator 20 on a power transmission path extending from the engine 1 to the drive wheel 7. Further, the term "provided in series" means that the variator 20 and the subtransmission mechanism 30 are provided in series on this power transmission path. The subtransmission mechanism 30 may be directly connected to an output shaft of the variator 20, as in this example, or via another transmission mechanism or power transmission mechanism (for example, a gear train).

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23*a*, 23*b* that is provided on a back surface of the movable conical plate and displaces the movable conical plate in an axial direction. When an oil pressure supplied to the hydraulic cylinder 23*a*, 23*b* is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism. The subtransmission mechanism 30 includes a Ravigneaux planetary gear mechanism 31 coupling the carriers of two planetary gear sets, and a plurality of frictional engagement elements (a Low brake 32, a High clutch 33, and a Rev brake 34) connected to a plurality of rotary elements constituting the Ravigneaux planetary gear mechanism 31 to modify the rotation states thereof. The gear position of the subtransmission mechanism 30 is changed by adjusting the oil pressure supplied to the respective frictional engagement elements 32 to 34 such that the engagement/disengagement states of the respective frictional engagement elements 32 to 34 are modified. For example, by engaging the Low brake 32 and disengaging the High clutch 33 and Rev brake 34, the gear position of the subtransmission mechanism 30 is set in a first speed. By engaging the High clutch 33 and disengaging the Low brake 32 and Rev brake 34, the gear position of the subtransmission mechanism 30 is set in a second speed having a smaller speed ratio than the first speed. By engaging the Rev brake 34 and disengaging the Low brake 32 and the High clutch 33, the gear position of the subtransmission mechanism 30 is set in reverse. It should be noted that in the following description, a state in which the gear position of the subtransmission mechanism 30 is in the first speed will be expressed as "the transmission 4 is in a low speed mode", and a state in which the gear position of the subtransmission mechanism 30 is in the second speed will be expressed as "the transmission 4 is in a high speed mode".

Figure 2:
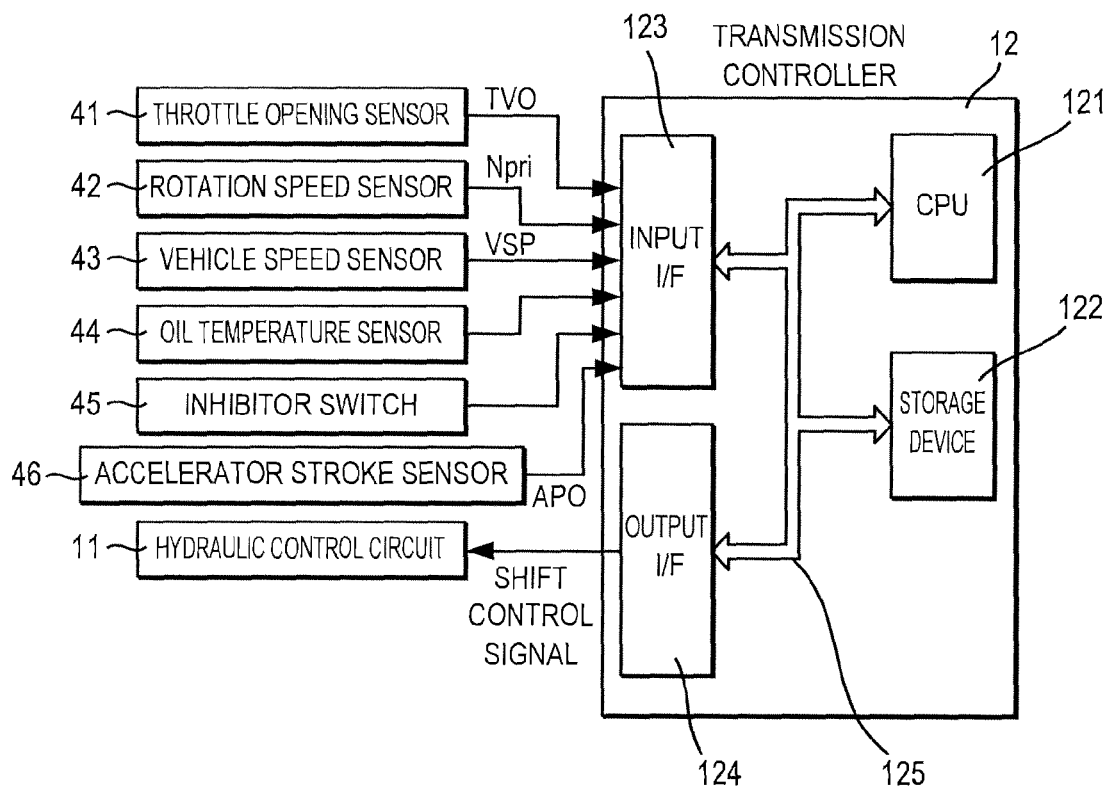
FIG. 2 is a view showing the internal constitution of a transmission controller according to the first embodiment of this invention.

As shown in FIG. 2, the transmission controller 12 is constituted by a CPU 121, a storage device 122 including a RAM and a ROM, an input interface 123, an output interface 124, and a bus 125 connecting these components to each other.

Output signals and the like from a throttle opening sensor 41, a rotation speed sensor 42, a vehicle speed sensor 43, an oil temperature sensor 44, an inhibitor switch 45, and an accelerator stroke sensor 46 are input into the input interface 123. The throttle opening sensor 41 detects an opening (to be referred to hereafter as a "throttle opening") TVO of a throttle valve of the engine 1. The rotation speed sensor 42 detects an input rotation speed (=a rotation speed of the primary pulley 21, to be referred to hereafter as a "primary rotation speed") Npri of the transmission 4. The vehicle speed sensor 43 detects a traveling speed (to be referred to hereafter as a "vehicle speed") VSP of the vehicle. The oil temperature sensor 44 detects an oil temperature of the transmission 4. The inhibitor switch 45 detects a position of a select lever provided in the vehicle. The accelerator stroke sensor 46 detects a depression amount APO of an accelerator pedal.

The storage device 122 stores a shift control program for the transmission 4 and a shift map (FIG. 4) used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the transmission 4. As a result, the speed ratio vRatio of the variator 20 is modified and the gear position of the subtransmission mechanism 30 is changed, whereby a shift is performed in the transmission 4.

Figure 3:
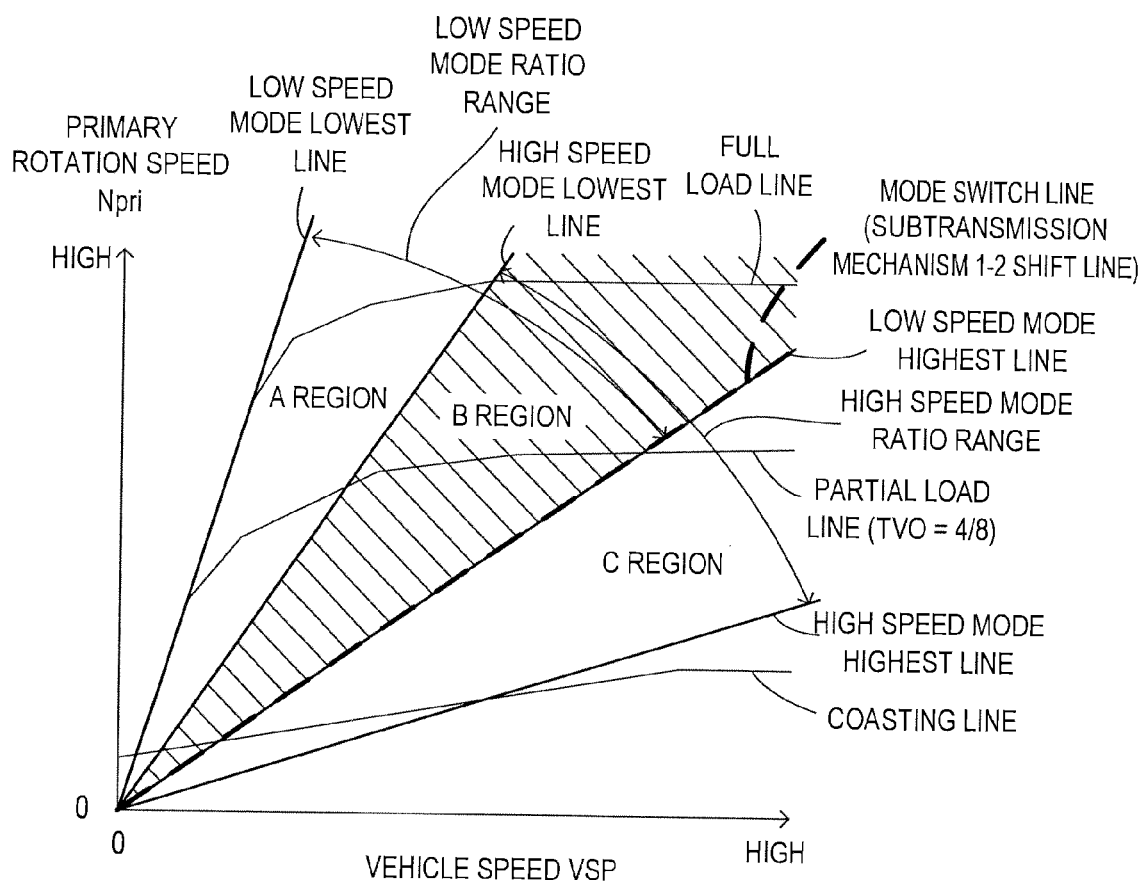
FIG. 3 is a view showing an example of a shift map of the transmission according to the first embodiment of this invention.

FIG. 3 shows an example of the shift map stored in the storage device 122 of the transmission controller 12.

On the shift map, an operating point of the transmission 4 is determined on the basis of the vehicle speed VSP and the primary rotation speed Npri. An incline of a line linking the operating point of the transmission 4 and a zero point in the lower left corner of the shift map indicates the speed ratio of the transmission 4 (an overall speed ratio obtained by multiplying the speed ratio of the subtransmission mechanism 30 with the speed ratio vRatio of the variator 20, to be referred to hereafter as a "through speed ratio Ratio").

On this shift map, similarly to a shift map of a conventional belt type continuously variable transmission, a shift line is set at each throttle opening TVO, and a shift is performed in the transmission 4 according to a shift line selected in accordance with the throttle opening TVO. For ease of understanding, FIG. 3 shows only a full load line (a shift line used when the throttle opening TVO=8/8), a partial load line (a shift line used when the throttle opening TVO=4/8), and a coasting line (a shift line used when the throttle opening TVO=0).

When the transmission 4 is in the low speed mode, the transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the transmission 4 moves within an A region and a B region.

When the transmission 4 is in the high speed mode, the transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the transmission 4 moves within the B region and a C region.

The speed ratios of the respective gear positions of the subtransmission mechanism 30 are set such that a speed ratio corresponding to the low speed mode Highest line (low speed mode Highest speed ratio) is smaller than a speed ratio corresponding to the high speed mode Lowest line (high speed mode Lowest speed ratio). In so doing, a low speed mode ratio range, which is the through speed ratio Ratio range of the transmission 4 in the low speed mode, and a high speed mode ratio range, which is the through speed ratio Ratio range of the transmission 4 in the high speed mode, partially overlap such that when the operating point of the transmission 4 is in the B region, which is sandwiched between the high speed mode Lowest line and the low speed mode Highest line, the transmission 4 can select either the low speed mode or the high speed mode.

Further, a mode switch shift line (a 1-2 shift line of the subtransmission mechanism 30) at which the subtransmission mechanism 30 performs a shift is set on the shift map to overlap the low speed mode Highest line. A through speed ratio corresponding to the mode switch shift line (to be referred to hereafter as a "mode switch speed ratio") mRatio is set at an equal value to the low speed mode Highest speed ratio. When the operating point of the transmission 4 crosses the mode switch shift line, or in other words when the through speed ratio Ratio of the transmission 4 varies across the mode switch speed ratio mRatio, a mode switch shift is performed.

In the mode switch shift, the transmission controller 12 performs a shift in the subtransmission mechanism 30 and modifies the speed ratio vRatio of the variator 20 in an opposite direction to a variation direction of the speed ratio of the subtransmission mechanism 30.

More specifically, when the through speed ratio Ratio of the transmission 4 shifts from a state of being larger than the mode switch speed ratio mRatio to a state of being smaller, the transmission controller 12 modifies the gear position of the subtransmission mechanism 30 from the first speed to the second speed (a subtransmission mechanism 1-2 shift) and modifies the speed ratio vRatio of the variator 20 to a large speed ratio side.

Conversely, when the through speed ratio Ratio of the transmission 4 shifts from a state of being smaller than the mode switch speed ratio mRatio to a state of being larger, the transmission controller 12 modifies the gear position of the subtransmission mechanism 30 from the second speed to the first speed (a subtransmission mechanism 2-1 shift) and modifies the speed ratio vRatio of the variator 20 to a small speed ratio side.

The reason for causing the speed ratio vRatio of the variator 20 to vary in the opposite direction to the speed ratio variation direction of the subtransmission mechanism 30 during a mode switch shift is to ensure that a step does not occur in the through speed ratio Ratio during the mode switch shift.

Hence, in this embodiment, a coordinated shift is implemented by varying the speed ratio of the variator 20 in alignment with speed ratio variation in the subtransmission mechanism 30 and completing speed ratio variation in the variator 20 substantially simultaneously with the completion of speed ratio variation in the subtransmission mechanism 30 to ensure that a step does not occur in the through speed ratio.

Incidentally, shifts performed by the transmission 4 include shifts performed in a power ON state and shifts performed in a power OFF state.

A shift performed in a power ON state is an upshift or a downshift performed when the accelerator pedal is depressed, or in other words when the input torque of the transmission 4 is positive torque. When the input torque of the transmission 4 is positive torque, drive torque is input into an input shaft of the transmission 4. A shift performed in a power OFF state is an upshift or a downshift performed when the accelerator pedal is not depressed, or in other words when the input torque of the transmission 4 is negative torque. When the input torque of the transmission 4 is negative torque, drive torque is input into an output shaft of the transmission 4.

Of these shifts, in an upshift (to be referred to hereafter as a "foot release upshift") performed in the power OFF state when a foot is completely released from the depressed accelerator pedal, or in other words when the accelerator pedal depression amount APO varies from a predetermined depression amount APO1 to zero, and an upshift (to be referred to hereafter as a "foot back upshift") performed in the power ON state when the foot is moved back from the depressed accelerator pedal, or in other words when the accelerator pedal depression amount APO varies from the predetermined depression amount APO1 to APO2 (APO1>APO2), a final through speed ratio DRatio, which is a through speed ratio to be reached at the current vehicle speed VSP and accelerator pedal depression amount APO, varies greatly. As a result, a stagnation period in which the engine rotation speed temporarily remains at the same rotation speed without varying may occur during the upshift. This problem will now be described with reference to FIGS. 14A-14E and 15A-15E.

FIGS. 14A-14E are time charts showing a case in which a stagnation period occurs during a foot back upshift, serving as a comparative example to this embodiment of this invention. FIGS. 15A-15E are time charts showing a case in which a stagnation period occurs during a foot release upshift, serving as a comparative example to this embodiment of this invention.

As shown in FIGS. 14A-14E, a foot back upshift is an upshift performed in the power ON state, and therefore the subtransmission mechanism 30 completes a switch from the low speed mode to the high speed mode via a preparatory phase, a torque phase, an inertia phase, and a final phase. As shown in FIGS. 15A-15E, on the other hand, a foot release upshift is an upshift performed in the power OFF state, and therefore the subtransmission mechanism 30 completes a switch from the low speed mode to the high speed mode via a preparatory phase, an inertia phase, a torque phase, and a final phase.

The preparatory phase is a phase for preparing to modify the gear position of the subtransmission mechanism 30. More specifically, an oil pressure of a disengagement side frictional engagement element of the subtransmission mechanism 30 is reduced to an initial disengagement pressure, and a target oil pressure of an engagement side frictional engagement element is held at a precharge pressure for a predetermined time and then lowered to a standby pressure (initial engagement pressure). The initial disengagement pressure is an oil pressure value for setting a torque capacity of the disengagement side frictional engagement element (the Low brake 32 in a 1-2 shift) such that the disengagement side frictional engagement element begins to slide. The standby pressure is an oil pressure value for setting a torque capacity of the engagement side frictional engagement element (the High clutch 33 in a 1-2 shift) such that the engagement side frictional engagement element becomes capable of transmitting torque.

The torque phase is a phase for shifting reception of the input torque of the subtransmission mechanism 30 from the disengagement side frictional engagement element to the engagement side frictional engagement element. More specifically, the oil pressure of the disengagement side frictional engagement element is reduced toward zero while the oil pressure of the engagement side frictional engagement element is increased from the standby pressure.

The inertia phase is a phase for controlling the oil pressure of the frictional engagement elements such that an input rotation speed of the subtransmission mechanism 30 varies from a pre-shift rotation speed to a post-shift rotation speed.

The final phase is a phase for raising the oil pressure of the engagement side frictional engagement element to a maximum oil pressure such that the engagement side frictional engagement element is fully engaged.

In this embodiment, the through speed ratio Ratio is varied toward the final through speed ratio DRatio at a predetermined transient response. In other words, a target through speed ratio Ratio0 for varying the through speed ratio Ratio toward the final through speed ratio DRatio at the predetermined transient response is set, whereupon the through speed ratio Ratio is controlled to the target through speed ratio Ratio0. A target speed ratio (to be referred to hereafter as a "variator target speed ratio") vRatio0 of the variator 20 is then calculated by dividing the target through speed ratio Ratio0 by the speed ratio of the subtransmission mechanism 30, whereupon the variator 20 is controlled such that the speed ratio vRatio of the variator 20 reaches the variator target speed ratio vRatio0. It should be noted that in this embodiment, the predetermined transient response is set as a temporary response.

Hence, before the start of the inertia phase in which the speed ratio of the subtransmission mechanism 30 varies, only the speed ratio vRatio of the variator 20 is varied to control the through speed ratio Ratio to the target through speed ratio Ratio0. Accordingly, as shown in FIGS. 14A-14E and 15A-15E, if the speed ratio vRatio of the variator 20 reaches a Highest speed ratio of the variator 20 (to be referred to hereafter as a "variator Highest speed ratio") before the start of the inertia phase, the through speed ratio Ratio does not vary until the start of the inertia phase, as indicated by parts surrounded by broken lines in the figures.

The engine rotation speed is obtained by multiplying the through speed ratio Ratio by the output rotation speed of the transmission 4, and therefore a stagnation period in which the engine rotation speed does not vary occurs despite the fact that an upshift is underway. As a result, smooth rotation variation is impaired during the shift, leading to a reduction in driving performance. Further, when the output rotation speed of the transmission 4 is high, or in other words when the vehicle speed is high, the stagnation period occurs while the engine rotation speed is high, and therefore the fuel efficiency also deteriorates.

Hence, in this embodiment, adverse effects on the driving performance and the fuel efficiency caused by the occurrence of a stagnation period are suppressed by shortening the time required to reach the inertia phase from the start of a shift.

Figure 4:
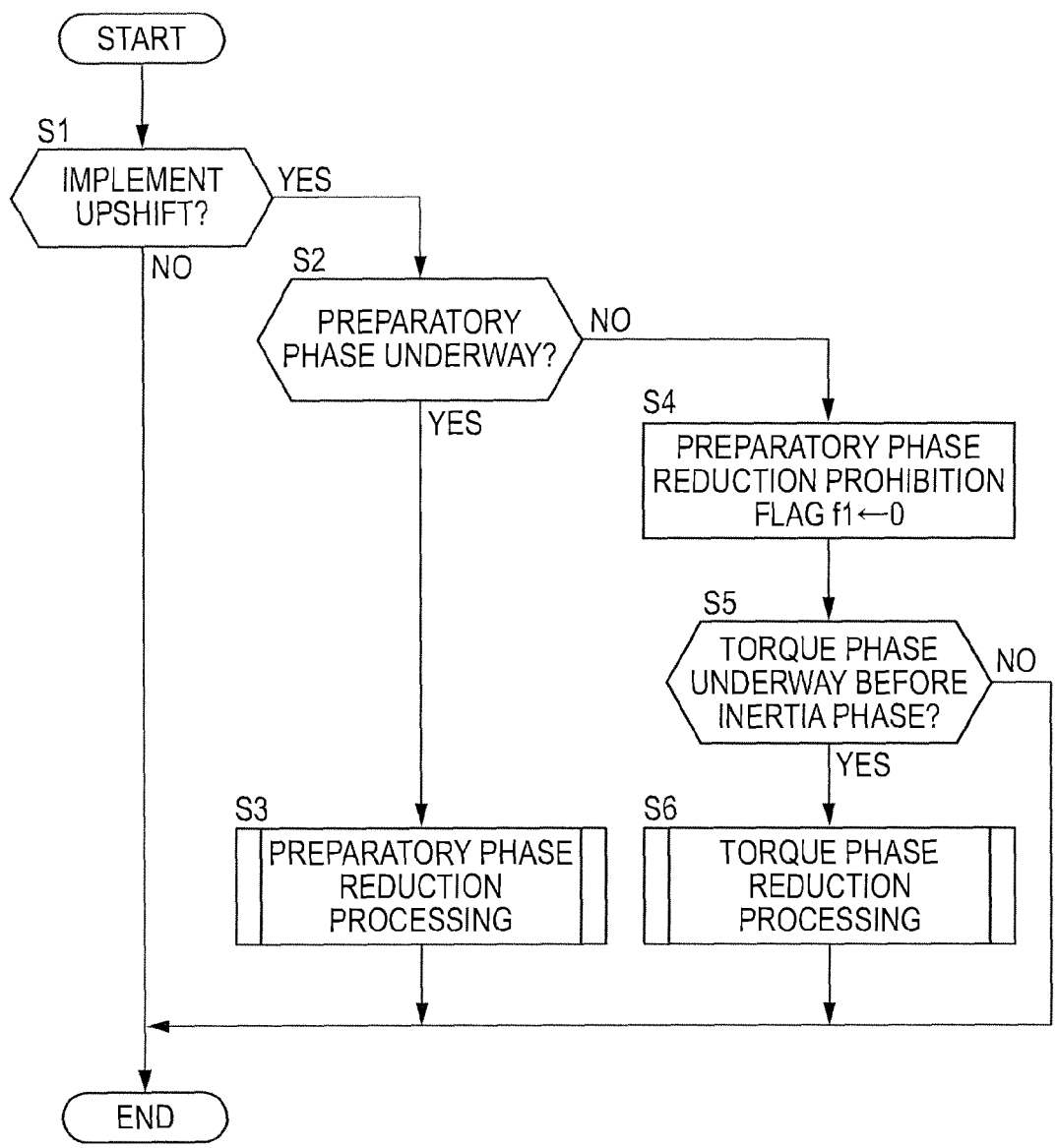
FIG. 4 shows a shift control routine according to the first embodiment of this invention.

FIG. 4 shows a shift control routine according to this embodiment, which is executed by the transmission controller 12. The transmission controller 12 executes this routine repeatedly in a predetermined calculation period. In this embodiment, the predetermined calculation period is set at 10 ms.

In a step S1, the transmission controller 12 determines whether or not to implement an upshift in accordance with a mode switch. More specifically, the transmission controller 12 makes this determination on the basis of the through speed ratio Ratio, the final through speed ratio DRatio, and the mode switch speed ratio mRatio. When an upshift is to be implemented in accordance with the mode switch, the transmission controller 12 performs the processing of a step S2, and when an upshift is not to be implemented, the transmission controller 12 terminates the current processing.

In the step S2, the transmission controller 12 determines whether or not the preparatory phase is underway. More specifically, the transmission controller 12 determines whether or not an elapsed time from the start of the upshift has reached a preparatory phase end time. When the preparatory phase is underway, the transmission controller 12 performs the processing of a step S3, and when the preparatory phase is not underway, the transmission controller 12 performs the processing of a step S4.

In the step S3, the transmission controller 12 implements a preparatory phase reduction processing subroutine. The preparatory phase reduction processing subroutine will be described below with reference to FIG. 5.

In the step S4, the transmission controller 12 sets a preparatory phase reduction prohibition flag f1 at zero.

In a step S5, the transmission controller 12 determines whether or not the torque phase is underway before the inertia phase. When the torque phase is underway before the inertia phase, the transmission controller 12 performs the processing of a step S6, and when the torque phase is not underway before the inertia phase, the transmission controller 12 terminates the current processing.

In the step S6, the transmission controller 12 implements a torque phase reduction processing subroutine. The torque phase reduction processing subroutine will be described below with reference to FIG. 6.

Figure 5:
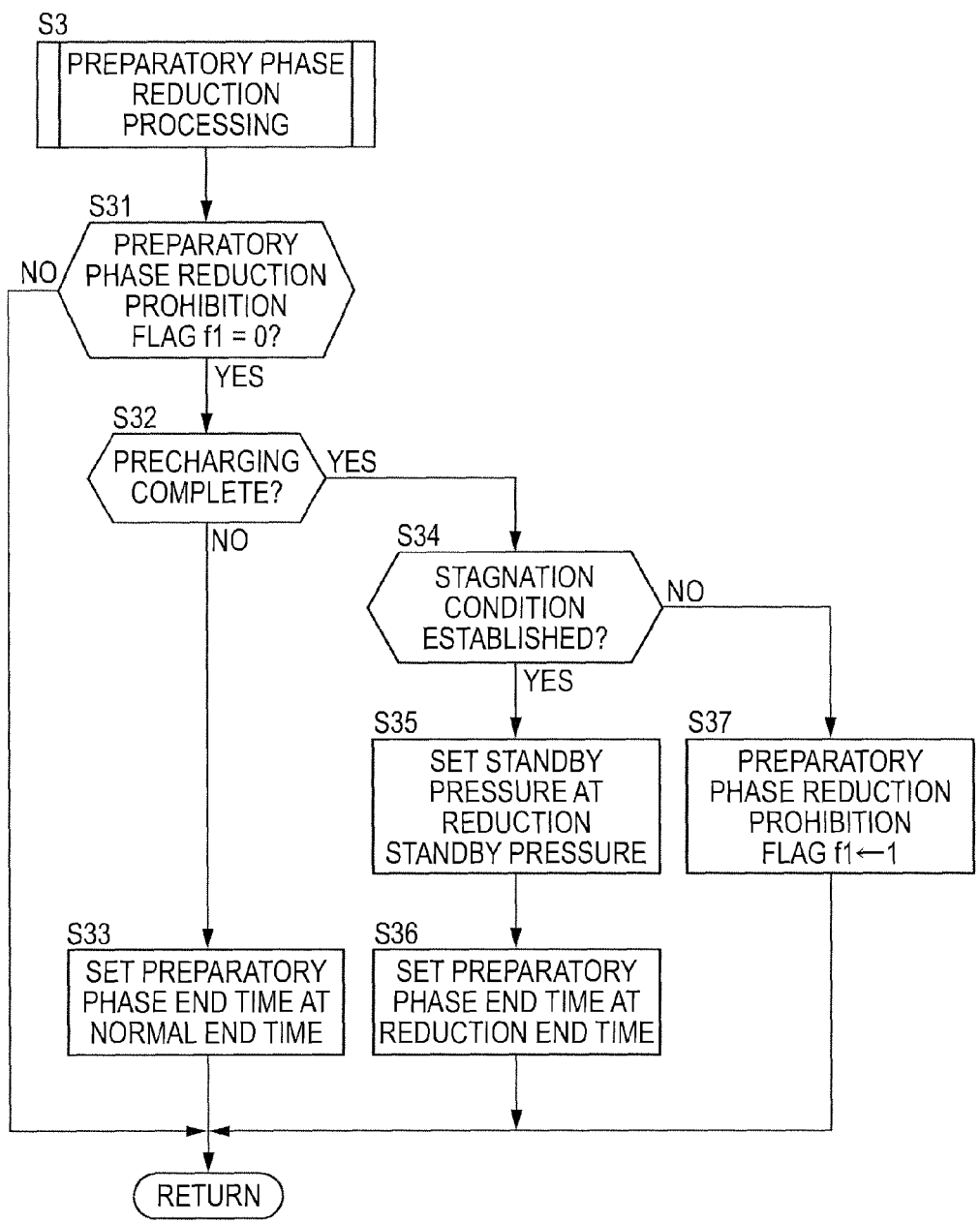
FIG. 5 shows a preparatory phase reduction processing subroutine according to the first embodiment of this invention.

FIG. 5 is a flowchart illustrating the preparatory phase reduction processing subroutine.

In a step S31, the transmission controller 12 determines whether or not the preparatory phase reduction prohibition flag f1 is set at one. When the preparatory phase reduction prohibition flag f1 is set at zero, the transmission controller 12 performs the processing of a step S32. When the preparatory phase reduction prohibition flag f1 is set at one, on the other hand, the transmission controller 12 terminates the current processing.

In the step S32, the transmission controller 12 determines whether or not precharging is complete. When precharging is not complete, the transmission controller 12 performs the processing of a step S33. When precharging is complete, on the other hand, the transmission controller 12 performs the processing of a step S34.

In the step S33, the transmission controller 12 sets the preparatory phase end time at a normal target time. The normal target time is a predetermined value.

In the step S34, the transmission controller 12 determines whether or not a stagnation condition is established. More specifically, the transmission controller 12 determines whether there is a possibility of a stagnation period occurring during the upshift by determining whether or not following conditional expressions (1) and (2) are satisfied. These conditional expressions will be described below with reference to FIG. 7. When the stagnation condition is established, the transmission controller 12 performs the processing of a step S35, and when the stagnation condition is not established, the transmission controller 12 performs the processing of a step S37.

$$\text{Through speed ratio} < (\text{stagnation speed ratio} + \text{first predetermined value}) \quad (1)$$

$$\text{Final through speed ratio} < (\text{stagnation speed ratio} - \text{second predetermined value}) \quad (2)$$

Here, stagnation speed ratio=variator Highest speed ratio× first gear position speed ratio of subtransmission mechanism.

In the step S35, the transmission controller 12 sets the standby pressure at a reduction standby pressure, which is higher than the standby pressure during a normal operation (to be referred to hereafter as a "normal standby pressure").

In a step S36, the transmission controller 12 sets the preparatory phase end time at a reduction end time which is earlier than the normal end time.

In the step S37, the transmission controller 12 sets the preparatory phase reduction prohibition flag f1 at one.

Figure 6:
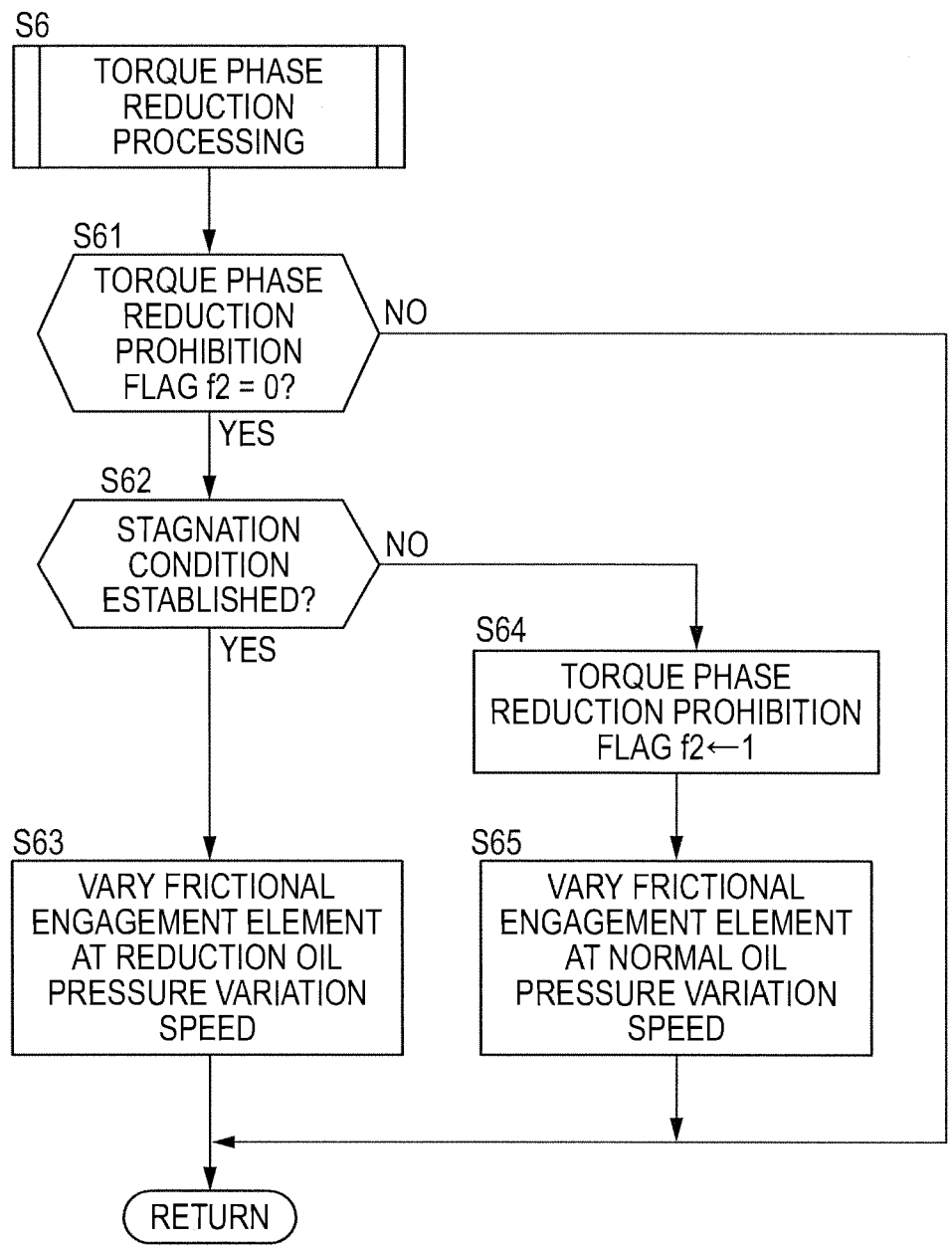
FIG. 6 shows a torque phase reduction processing subroutine according to the first embodiment of this invention.

FIG. 6 is a flowchart illustrating the torque phase reduction processing subroutine.

In a step S61, the transmission controller 12 determines whether or not a torque phase reduction prohibition flag f2 is set at one. When the torque phase reduction prohibition flag f2 is set at zero, the transmission controller 12 performs the processing of a step S62. When the torque phase reduction prohibition flag f2 is set at one, on the other hand, the transmission controller 12 terminates the current processing.

In the step S62, the transmission controller 12 determines whether or not the stagnation condition is established. More specifically, the transmission controller 12 determines whether or not aforementioned conditional expressions (1) and (2) are satisfied. When the stagnation condition is established, the transmission controller 12 performs the processing of a step S63, and when the stagnation condition is not established, the transmission controller 12 performs the processing of a step S64.

In the step S63, the transmission controller 12 varies the oil pressure of the engagement side and disengagement side frictional engagement elements at a reduction oil pressure variation speed which is higher than a normal oil pressure variation speed. The normal oil pressure variation speed is determined in advance through experiment or the like, taking into account shift shock and the like.

In the step S64, the transmission controller 12 sets the torque phase reduction prohibition flag f2 at one.

In a step S65, the transmission controller 12 varies the oil pressure of the engagement side and disengagement side frictional engagement elements at the normal oil pressure variation speed.

FIGS. 7A-7C and 8A-8C are time charts respectively showing a case in which the accelerator pedal depression amount is reduced such that the final through speed ratio varies to an upshift side and the through speed ratio Ratio is controlled toward the final through speed ratio DRatio at the predetermined transient response. The aforementioned conditional expressions (1) and (2) will now be described with reference to these time charts.

The conditional expression (1) determines whether the through speed ratio is smaller than a first threshold (stagnation speed ratio+first predetermined value). This conditional expression is used to determine an amount of time remaining before the stagnation period begins in a case where the stagnation period occurs. When the through speed ratio is smaller than the first threshold, it may be determined that little time remains before the stagnation period begins.

The conditional expression (2) determines whether the final through speed ratio is smaller than a second threshold (stagnation speed ratio−second predetermined value). This conditional expression is used to determine a difference between the stagnation speed ratio and the final through speed ratio. When the final through speed ratio is smaller than the second threshold, it may be determined that the through speed ratio is comparatively large, or in other words that stagnation will occur while the engine rotation speed is high, leading to a reduction in fuel efficiency.

The first predetermined value and the second predetermined value may be set appropriately by determining values required for making the above determinations in advance through experiment or the like.

In the case shown in FIGS. 7A-7C, as the final through speed ratio varies to the upshift side, the final through speed ratio falls below the second threshold at a time t51 such that the conditional expression (2) is satisfied, and when the through speed ratio falls below the first threshold at a time t52, the conditional expression (1) is satisfied.

In the case shown in FIGS. 8A-8C, the final through speed ratio does not fall below the second threshold at a time t61 even when the final through speed ratio varies to the upshift side, and therefore the conditional expression (2) is not satisfied.

FIGS. 9A-9E are time charts illustrating a shift control operation according to this embodiment in a case where the preparatory phase and the torque phase are respectively shortened during a foot back upshift.

At a time t11, the foot is moved back from the accelerator pedal such that the final through speed ratio varies to the upshift side, and as a result, the foot back upshift begins. The foot back upshift is performed in the power ON state, and therefore the subtransmission mechanism 30 completes the switch from the low speed mode to the high speed mode via the preparatory phase, the torque phase, the inertia phase, and the final phase.

At a time t12, upon the completion of precharging, during which the target oil pressure of the engagement side frictional engagement element is held at a precharge pressure for a predetermined time, a determination is made as to whether or not the stagnation determination condition is established. At the time t12, the through speed ratio Ratio is smaller than the first threshold and the final through speed ratio DRatio is smaller than the second threshold, and therefore the stagnation determination condition is established. Accordingly, the standby pressure is set at the reduction standby pressure and the preparatory phase end time is modified from the normal end time to the reduction end time. As a result, the implementation period of the preparatory phase is shortened.

When the stagnation determination condition is not established at the end of precharging, the oil pressure of the engagement side frictional engagement element is held at the normal standby pressure and the preparatory phase end time is held at the normal end time even if the stagnation determination condition is established thereafter. The reason for this is that when the oil pressure of the engagement side frictional engagement element is raised from the normal standby pressure to the reduction standby pressure midway, a stroke completion timing of the engagement side frictional engagement element becomes uncertain, making it impossible to determine the degree by which the preparatory phase is to be shortened. When the preparatory phase period is made too short, the oil pressure of the engagement side frictional engagement element may become insufficient, leading to a response delay in the engagement side frictional engagement element at the start of the torque phase. Further, when the preparatory phase period is made too long, since the oil pressure of the engagement side frictional engagement element is at the reduction standby pressure, which is higher than the normal standby pressure, a transmission torque varies by an amount corresponding to the increased standby pressure, and as a result, shock may be generated at the initial stage of the torque phase.

At a time t13, when the speed ratio vRatio of the variator 20 reaches the Highest speed ratio, the through speed ratio Ratio does not vary. In other words, the stagnation period in which the engine rotation speed does not vary begins.

At a time t14, an elapsed time from the start of the shift (t11) reaches the reduction end time, and therefore the preparatory phase ends and the torque phase begins. When the torque phase begins, establishment of the stagnation determination condition is determined again. Here, the stagnation determination condition is established, and therefore the oil pressure of the engagement side and disengagement side frictional engagement elements is varied at the reduction oil pressure variation speed, which is higher than the normal oil pressure variation speed. As a result, the implementation period of the torque phase is shortened.

At a time t15, the inertia phase, in which the speed ratio of the subtransmission mechanism 30 starts to vary, begins, and therefore the through speed ratio Ratio varies as the speed ratio of the subtransmission mechanism varies. Accordingly, the stagnation period ends.

FIGS. 10A-10E are time charts illustrating a shift control operation according to this embodiment in a case where only the torque phase is shortened during a foot back upshift.

When the foot back upshift begins at a time t21, the subtransmission mechanism 30 completes the switch from the low speed mode to the high speed mode via the preparatory phase, the torque phase, the inertia phase, and the final phase.

When precharging ends at a time t22, a determination is made as to whether or not the stagnation determination condition is established. At the time t22, the through speed ratio Ratio is larger than the first threshold, and therefore the stagnation determination condition is not established. Hence, the oil pressure of the engagement side frictional engagement element is set at the normal standby pressure and the preparatory phase end time is held at the normal end time.

When the speed ratio vRatio of the variator 20 reaches the Highest speed ratio at a time t23, the stagnation period in which the through speed ratio Ratio does not vary begins.

When the elapsed time from the start of the shift (the time t21) reaches the normal end time at a time t24, the torque phase begins. When the torque phase begins, establishment of the stagnation determination condition is determined again. At the time t24, the through speed ratio Ratio is smaller than the first threshold and the final through speed ratio DRatio is smaller than the second threshold, and therefore the stagnation determination condition is established. Hence, the oil pressure of the engagement side and disengagement side frictional engagement elements is varied at the reduction oil pressure variation speed, which is higher than the normal oil pressure variation speed. As a result, the implementation period of the torque phase is shortened.

At a time t25, the inertia phase, in which the speed ratio of the subtransmission mechanism 30 starts to vary, begins, and therefore the through speed ratio Ratio varies as the speed ratio of the subtransmission mechanism varies. Accordingly, the stagnation period ends.

FIGS. 11A-11E are time charts illustrating a shift control operation according to this embodiment in a case where a foot release upshift is performed.

At a time t31, the foot is removed from the accelerator pedal such that the final through speed ratio varies to the upshift side, and therefore the foot release upshift begins. The foot release upshift is performed in the power OFF state, and therefore the subtransmission mechanism 30 completes the switch from the low speed mode to the high speed mode via the preparatory phase, the inertia phase, the torque phase, and the final phase.

At a time t32, upon the completion of precharging, a determination is made as to whether or not the stagnation determination condition is established. At the time t32*, the through speed ratio Ratio is smaller than the first threshold and the final through speed ratio DRatio is smaller than the second threshold, and therefore the stagnation determination condition is established. Accordingly, the standby pressure is set at the reduction standby pressure and the preparatory phase end time is modified from the normal end time to the reduction end time. As a result, the implementation period of the preparatory phase is shortened.

At a time t33, the speed ratio vRatio of the variator 20 reaches the Highest speed ratio, and therefore the stagnation period in which the through speed ratio Ratio does not vary begins.

At a time t34, an elapsed time from the start of the shift (the time 31) reaches the reduction end time, and therefore the inertia phase begins. When the inertia phase begins, the speed ratio of the subtransmission mechanism 30 begins to vary such that the through speed ratio Ratio varies, and therefore the stagnation period ends.

According to the embodiment described above, when the stagnation determination condition is established during an upshift accompanying a mode switch, the implementation period of one or both of the preparatory phase and the torque phase of the subtransmission mechanism 30 is shortened. As a result, the time required to advance from the start of the shift to the inertia phase can be reduced, and therefore the stagnation period can be shortened. Accordingly, the engine rotation speed can be reduced smoothly during the upshift, thereby suppressing deterioration of the driving performance. Moreover, deterioration of the fuel efficiency caused by an extended stagnation period can be suppressed.

Further, when the preparatory phase is shortened, the standby pressure is set at the reduction standby pressure, which is higher than the normal standby pressure. In so doing, the stroke of the engagement side frictional engagement element can be completed even when the preparatory phase is shortened, and therefore torque capacity can be secured in the engagement side frictional engagement element in the subsequent torque phase.

It should be noted that the preparatory phase may also be shortened using a method of extending the precharge period or increasing the precharge pressure. However, when these methods are employed, the stroke of the engagement side frictional engagement element may be completed during the precharging, depending on irregularities, and as a result, interlocking may occur, causing the driving performance to deteriorate. Therefore, the preparatory phase is preferably not shortened by modifying the precharge period and so on.

Referring to FIG. 12 and FIGS. 13A-13E, a second embodiment of this invention will be described. The second embodiment differs from the first embodiment in that the period of the transient response employed when controlling the through speed ratio Ratio toward the final through speed ratio DRatio is increased, or in other words a time constant is increased. This difference will be described below. It should be noted that parts of the second embodiment to be described below exhibiting similar functions to those of the first embodiment described above have been allocated identical reference symbols and where appropriate, duplicate description thereof has been omitted.

Figure 12:
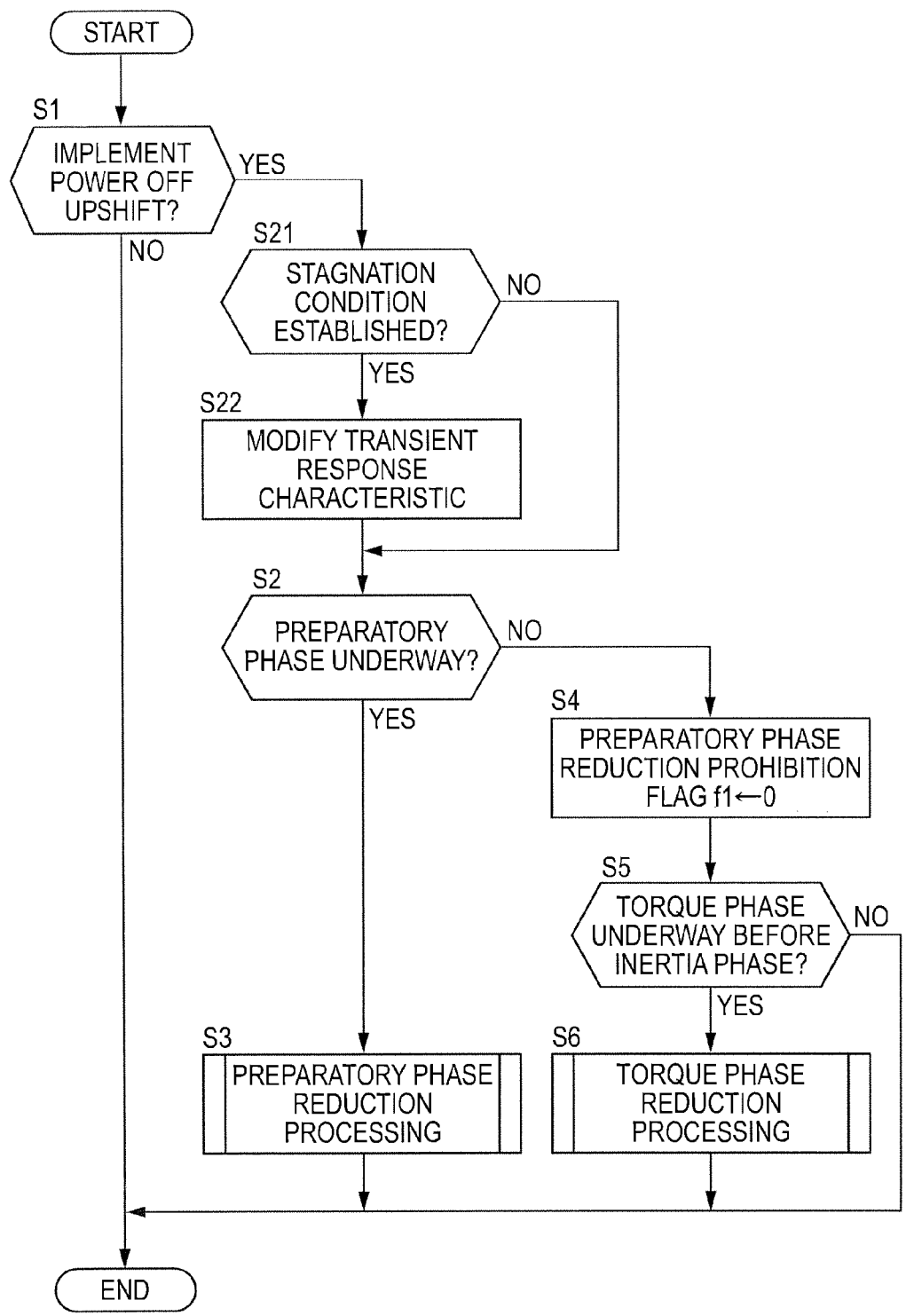
FIG. 12 shows a shift control routine according to a second embodiment of this invention.

FIG. 12 shows an example of a shift control routine according to the second embodiment. The transmission controller 12 executes this routine in place of the routine according to the first embodiment, shown in FIG. 4.

In the steps S1 to S6, identical processing to that of the first embodiment is implemented, and therefore description thereof has been omitted.

In a step S21, the transmission controller 12 determines whether or not the stagnation determination condition is established. More specifically, the transmission controller 12 determines whether or not the aforementioned conditional expressions (1) and (2) are established. When the conditional expressions (1) and (2) are established, the transmission controller 12 performs the processing of a step S22, and when the conditional expressions (1) and (2) are not established, the transmission controller 12 performs the processing of the step S2.

In the step S22, the transmission controller 12 increases the period of the transient response employed when controlling the through speed ratio Ratio toward the final through speed ratio DRatio in comparison with a normal operation. More specifically, the transmission controller 12 increases the time required for the through speed ratio Ratio to reach the final through speed ratio DRatio beyond that of a normal operation by increasing a time constant of the transient response.

FIGS. 13A-13E are time charts illustrating a shift control operation according to the second embodiment in a case where the period of the transient response employed when controlling the through speed ratio Ratio toward the final through speed ratio DRatio is increased while shortening the preparatory phase and the torque phase during a foot back upshift.

At a time t41, the foot is moved back from the accelerator pedal such that the final through speed ratio DRatio varies to the upshift side, and as a result, the foot back upshift begins. At the same time, a determination is made as to whether or not the stagnation condition is established. It is assumed here that the stagnation condition is established, and therefore the through speed ratio Ratio is controlled toward the final through speed ratio DRatio after increasing the period of the transient response beyond that of a normal operation.

As a result, the time required for the variator speed ratio vRatio to reach the Highest speed ratio, or in other words the time period between the time t41 and a time t42, increases beyond that of a normal operation. Therefore, the time required for the inertia phase to begin after the variator speed ratio vRatio reaches the Highest speed ratio, or in other words the time period between the time t42 and a time t43, can be shortened, enabling a reduction in the stagnation period. Accordingly, smooth rotation variation during the shift is not impaired, and deterioration of the driving performance can be suppressed. Moreover, when the implementation period of the preparatory phase and the torque phase is shortened, this effect can be obtained even more strikingly.

It should be noted that this invention is not limited to the above embodiments, and various modifications may be implemented within the scope of the technical spirit thereof.

For example, in the above embodiments, the stagnation determination is implemented using the through speed ratio Ratio as a reference, but the stagnation determination may be implemented in accordance with following conditional expressions (3) and (4) using the primary rotation speed Npri as a reference.

Primary rotation speed<(stagnation rotation speed+ third predetermined value) (3)

Final primary rotation speed<(stagnation rotation speed−fourth predetermined value) (4)

Here, stagnation rotation speed=transmission output rotation×variator Highest speed ratio×speed ratio of first gear position of subtransmission mechanism.

Further, the first predetermined value and second predetermined value are set at fixed values but may be made variable in accordance with the vehicle speed, the oil temperature, and the accelerator pedal depression amount. This applies likewise to the third predetermined value and the fourth predetermined value.

Furthermore, the subtransmission mechanism 30 is a transmission mechanism having two positions, namely the first speed and the second speed, as forward gear positions, but the subtransmission mechanism 30 may be a transmission mechanism having three or more gear positions as forward gear positions.

Moreover, the subtransmission mechanism 30 is constituted by a Ravigneaux type planetary gear mechanism but is not limited to this constitution. For example, the subtransmission mechanism 30 may be constituted by a combination of a normal planetary gear mechanism and a frictional engagement element or by a plurality of power transmission paths formed from a plurality of gear trains having different gear ratios and a frictional engagement element for switching the power transmission paths.

Further, the hydraulic cylinders 23a, 23b are provided as actuators that displace the movable conical plates of the pulleys 21, 22 in the axial direction, but the actuators are not limited to hydraulic driving and may be driven electrically.

Furthermore, the mode switch speed ratio is set at an equal value to the low speed mode Highest speed ratio, but here, the term "equal to" includes a case in which the mode switch speed ratio is substantially equal to the low speed mode Highest speed ratio, and this case is also included in the technical scope of this invention.

Moreover, in the above description, a so-called belt type continuously variable transmission mechanism using a belt and pulleys was cited as an example of the continuously variable transmission mechanism, but the continuously variable transmission mechanism is not limited thereto and may be a so-called chain type continuously variable transmission mechanism using a chain and pulleys or a so-called toroidal continuously variable transmission mechanism using a power roller and input/output disks, for example.

The invention claimed is:

1. A control device for a vehicle continuously variable transmission comprising:
a continuously variable transmission mechanism having a speed ratio that can he modified continuously; and
a subtransmission mechanism provided in series with the continuously variable transmission mechanism, including a first gear position and a second gear position, the second gear position having a smaller speed ratio than the first gear position, as forward gear positions, and switching between the first gear position and the second gear position by engaging or disengaging a plurality of frictional engagement elements selectively,
wherein the control device comprises a transmission controller programmed to:
set an overall speed ratio of the continuously variable transmission mechanism and the subtransmission mechanism reachable on the basis of an operating condition of the vehicle as a final speed ratio;

control the continuously variable transmission mechanism and the subtransmission mechanism such that the overall speed ratio aligns with the final speed ratio at a predetermined transient response;

determine whether a stagnation period in which the overall speed ratio stops varying will occur during an upshift; and after determining that the stagnation period will occur, shorten time required to advance to an inertia phase from commencement of shifting in the subtransmission mechanism.

2. The control device for a vehicle continuously variable transmission as defined in claim 1, wherein the transmission controller is further programmed to shorten implementation of a torque phase of the subtransmission mechanism by increasing a variation speed of an oil pressure supplied to a disengagement side frictional engagement element and an engagement side frictional engagement element during the torque phase beyond that of a normal operation such that time required to advance to the inertia phase is reduced.

3. The control device for a vehicle continuously variable transmission as defined in claim 2, wherein the transmission controller is further programmed to shorten implementation of a preparatory phase of the subtransmission mechanism by advancing a preparatory phase end time in comparison with that of a normal operation such that time required to advance to the inertia phase is reduced.

4. The control device for a vehicle continuously variable transmission as defined in claim 2, wherein the transmission controller is further programmed to extend a period of the transient response after determining that the stagnation period will occur.

5. The control device for a vehicle continuously variable transmission as defined in claim 1, wherein the transmission controller is further programmed to shorten implementation of a preparatory phase of the subtransmission mechanism by advancing a preparatory phase end time in comparison with that of a normal operation such that time required to advance to the inertia phase is reduced.

6. The control device for a vehicle continuously variable transmission as defined in claim 5, wherein the transmission controller is further programmed to increase a standby pressure of an engagement side frictional engagement element set during the preparatory phase beyond that of a normal operation when advancing the preparatory phase end time of the subtransmission mechanism in comparison with that of a normal operation.

7. The control device for a vehicle continuously variable transmission as defined in claim 6, wherein the transmission controller is further programmed to extend a period of the transient response after determining that the stagnation period will occur.

8. The control device for a vehicle continuously variable transmission as defined in claim 5, wherein the transmission controller is further programmed to extend a period of the transient response after determining that the stagnation period will occur.

9. The control device for a vehicle continuously variable transmission as defined in claim 1, wherein the transmission controller is further programmed to extend a period of the transient response after determining that the stagnation period will occur.

10. A control device for a vehicle continuously variable transmission comprising:

a continuously variable transmission mechanism having a speed ratio that can be modified continuously; and a subtransmission mechanism provided in series with the continuously variable transmission mechanism, including a first gear position and a second gear position, the second gear position having a smaller speed ratio than the first gear position, as forward gear positions, and switching between the first gear position and the second gear position by engaging or disengaging a plurality of frictional engagement elements selectively, wherein the control device comprises:

final speed ratio setting means for setting an overall speed ratio of the continuously variable transmission mechanism and the subtransmission mechanism reachable on the basis of an operating condition of the vehicle as a final speed ratio;

shift control means for controlling the continuously variable transmission mechanism and the subtransmission mechanism such that the overall speed ratio aligns with the final speed ratio at a predetermined transient response;

stagnation determining means for determining whether a stagnation period in which the overall speed ratio stops varying will occur during an upshift; and reduction control means for shortening time required to advance to an inertia phase from commencement of shifting in the subtransmission mechanism following determination that the stagnation period will occur.

11. A control method for a vehicle continuously variable transmission comprising:

a continuously variable transmission mechanism having a speed ratio that can be modified continuously; and a subtransmission mechanism provided in series with the continuously variable transmission mechanism, including a first gear position and a second gear position, the second gear position having a smaller speed ratio than the first gear position, as forward gear positions, and switching between the first gear position and the second gear position by engaging or disengaging a plurality of frictional engagement elements selectively, wherein the control method comprises:

setting, using a transmission controller, an overall speed ratio of the continuously variable transmission mechanism and the subtransmission mechanism reachable on the basis of an operating condition of a vehicle as a final speed ratio;

controlling, using the transmission controller, the continuously variable transmission mechanism and the subtransmission mechanism such that the overall speed ratio aligns with the final speed ratio at a predetermined transient response;

determining, using the transmission controller, whether a stagnation period in which the overall speed ratio stops varying will occur during an upshift; and shortening using the transmission controller, time required to advance to an inertia phase from commencement of shifting in the subtransmission mechanism after determining that the stagnation period will occur.

* * * * *